(12) United States Patent
Sharp et al.

(10) Patent No.: US 7,849,232 B2
(45) Date of Patent: Dec. 7, 2010

(54) METHOD AND APPARATUS FOR USING A SINGLE MULTI-FUNCTION ADAPTER WITH DIFFERENT OPERATING SYSTEMS

(75) Inventors: Robert O. Sharp, Round Rock, TX (US); Kenneth G. Keels, Georgetown, TX (US); Brian S. Hausauer, Austin, TX (US); John S. Lacombe, Austin, TX (US)

(73) Assignee: Intel-NE, Inc., Wilmington, DE (US)

( * ) Notice: Subject to any disclaimer, the term of this patent is extended or adjusted under 35 U.S.C. 154(b) by 246 days.

(21) Appl. No.: 11/356,501

(22) Filed: Feb. 17, 2006

(65) Prior Publication Data

US 2007/0226386 A1    Sep. 27, 2007

(51) Int. Cl.
G06F 3/00 (2006.01)
G06F 15/167 (2006.01)
G06F 15/173 (2006.01)
G06F 9/455 (2006.01)

(52) U.S. Cl. .......................... 710/8; 709/212; 709/223; 709/226; 718/1; 718/100

(58) Field of Classification Search .................. 710/8
See application file for complete search history.

(56) References Cited

U.S. PATENT DOCUMENTS

| | | | |
|---|---|---|---|
| 5,400,326 A | 3/1995 | Smith | |
| 5,434,976 A | 7/1995 | Tan et al. | |
| 5,758,075 A | 5/1998 | Graziano et al. | |
| 5,832,216 A | 11/1998 | Szczepanek | |
| 5,953,511 A | 9/1999 | Sescila, III et al. | |
| 6,052,751 A | 4/2000 | Runaldue et al. | |
| 6,067,300 A | 5/2000 | Baumert et al. | |
| 6,145,045 A | 11/2000 | Falik et al. | |
| 6,199,137 B1 | 3/2001 | Aguilar et al. | |
| 6,243,787 B1 | 6/2001 | Kagan et al. | |
| 6,389,479 B1 | 5/2002 | Boucher et al. | |
| 6,400,730 B1 | 6/2002 | Latif et al. | |
| 6,408,347 B1 | 6/2002 | Smith et al. | |
| 6,418,201 B1 | 7/2002 | Holland et al. | |
| 6,427,171 B1 | 7/2002 | Craft et al. | |
| 6,502,156 B1 | 12/2002 | Sacker et al. | |
| 6,535,518 B1 | 3/2003 | Hu et al. | |

(Continued)

OTHER PUBLICATIONS

Shah, et al., "Direct Data Placement over Reliable Transports (Version 1.0)", RDMA Consortium document, Oct. 2002, pp. 1-35.

(Continued)

*Primary Examiner*—Henry W Tsai
*Assistant Examiner*—Michael Sun
(74) *Attorney, Agent, or Firm*—Christopher K. Gagne

(57) ABSTRACT

A flexible arrangement allows a single arrangement of Ethernet channel adapter (ECA) hardware functions to appear as needed to conform to various operating system deployment models. A PCI interface presents a logical model of virtual devices appropriate to the relevant operating system. Mapping parameters and values are associated with the packet streams to allow the packet streams to be properly processed according to the presented logical model and needed operations. Mapping occurs at both the host side and at the network side to allow the multiple operations of the ECA to be performed while still allowing proper delivery at each interface.

16 Claims, 11 Drawing Sheets

U.S. PATENT DOCUMENTS

| | | |
|---|---|---|
| 6,591,310 B1 | 7/2003 | Johnson |
| 6,594,329 B1 | 7/2003 | Susnow |
| 6,594,712 B1 | 7/2003 | Pettey et al. |
| 6,601,126 B1 | 7/2003 | Zaidi et al. |
| 6,625,157 B2 | 9/2003 | Niu et al. |
| 6,658,521 B1 | 12/2003 | Biran et al. |
| 6,661,773 B1 | 12/2003 | Pelissier et al. |
| 6,675,200 B1 | 1/2004 | Cheriton et al. |
| 6,690,757 B1 | 2/2004 | Bunton et al. |
| 6,693,901 B1 | 2/2004 | Byers et al. |
| 6,694,394 B1 | 2/2004 | Bachrach |
| 6,697,868 B2 | 2/2004 | Craft et al. |
| 6,704,831 B1 | 3/2004 | Avery |
| 6,751,235 B1 | 6/2004 | Susnow et al. |
| 6,760,307 B2 | 7/2004 | Dunning et al. |
| 6,763,419 B2 | 7/2004 | Hoese et al. |
| 6,778,548 B1 | 8/2004 | Burton et al. |
| 7,093,024 B2 | 8/2006 | Craddock et al. |
| 7,149,817 B2 | 12/2006 | Pettey |
| 7,149,819 B2 | 12/2006 | Pettey |
| 7,177,941 B2 | 2/2007 | Biran et al. |
| 7,299,266 B2 * | 11/2007 | Boyd et al. ............... 709/213 |
| 7,376,755 B2 * | 5/2008 | Pandya .................... 709/250 |
| 7,376,770 B2 * | 5/2008 | Arndt et al. ................ 710/62 |
| 7,383,483 B2 | 6/2008 | Biran et al. |
| 7,401,126 B2 | 7/2008 | Pekkala et al. |
| 7,426,674 B2 | 9/2008 | Anderson et al. |
| 7,451,197 B2 * | 11/2008 | Davis et al. ............... 709/220 |
| 2001/0049740 A1 | 12/2001 | Karpoff |
| 2002/0073257 A1 | 6/2002 | Beukema et al. |
| 2002/0085562 A1 | 7/2002 | Hufferd et al. |
| 2002/0147839 A1 | 10/2002 | Boucher et al. |
| 2002/0161919 A1 | 10/2002 | Boucher et al. |
| 2002/0172195 A1 * | 11/2002 | Pekkala et al. ............. 370/360 |
| 2003/0031172 A1 | 2/2003 | Grinfeld |
| 2003/0050990 A1 * | 3/2003 | Craddock et al. ........... 709/212 |
| 2003/0097428 A1 | 5/2003 | Afkhami et al. |
| 2003/0165160 A1 * | 9/2003 | Minami et al. ............. 370/466 |
| 2003/0169775 A1 | 9/2003 | Fan et al. |
| 2003/0200284 A1 | 10/2003 | Philbrick et al. |
| 2003/0217185 A1 | 11/2003 | Thakur et al. |
| 2003/0237016 A1 | 12/2003 | Johnson et al. |
| 2004/0010545 A1 | 1/2004 | Pandya |
| 2004/0015622 A1 | 1/2004 | Avery |
| 2004/0030770 A1 | 2/2004 | Pandya |
| 2004/0037319 A1 | 2/2004 | Pandya |
| 2004/0049600 A1 | 3/2004 | Boyd et al. |
| 2004/0049774 A1 | 3/2004 | Boyd et al. |
| 2004/0062267 A1 | 4/2004 | Minami et al. |
| 2004/0083984 A1 | 5/2004 | White |
| 2004/0085984 A1 | 5/2004 | Elzur |
| 2004/0093389 A1 * | 5/2004 | Mohamed et al. ........... 709/212 |
| 2004/0093411 A1 * | 5/2004 | Elzur et al. ................ 709/224 |
| 2004/0098369 A1 | 5/2004 | Elzur |
| 2004/0100924 A1 | 5/2004 | Yam |
| 2004/0153578 A1 | 8/2004 | Elzur |
| 2004/0193908 A1 | 9/2004 | Garcia et al. |
| 2004/0221276 A1 | 11/2004 | Raj |
| 2005/0044264 A1 * | 2/2005 | Grimminger et al. ........ 709/238 |
| 2005/0080982 A1 * | 4/2005 | Vasilevsky et al. ............. 711/1 |
| 2005/0102682 A1 * | 5/2005 | Shah et al. ................. 719/321 |
| 2005/0149623 A1 | 7/2005 | Biran et al. |
| 2005/0220128 A1 | 10/2005 | Tucker et al. |
| 2005/0223118 A1 | 10/2005 | Tucker et al. |
| 2006/0045098 A1 * | 3/2006 | Krause ...................... 370/396 |
| 2006/0126619 A1 * | 6/2006 | Teisberg et al. ............. 370/389 |
| 2006/0230119 A1 | 10/2006 | Hausauer et al. |
| 2006/0236063 A1 | 10/2006 | Hausauer et al. |
| 2006/0248047 A1 * | 11/2006 | Grier et al. .................... 707/2 |
| 2006/0251109 A1 * | 11/2006 | Muller et al. .............. 370/463 |
| 2006/0259644 A1 | 11/2006 | Boyd et al. |
| 2006/0274787 A1 * | 12/2006 | Pong ........................ 370/469 |
| 2007/0083638 A1 | 4/2007 | Pinkerton et al. |
| 2007/0136554 A1 | 6/2007 | Biran et al. |
| 2007/0165672 A1 | 7/2007 | Keels et al. |
| 2007/0168567 A1 | 7/2007 | Boyd et al. |
| 2007/0198720 A1 | 8/2007 | Rucker |
| 2007/0208820 A1 | 9/2007 | Makhervaks et al. |
| 2007/0226750 A1 | 9/2007 | Sharp et al. |
| 2008/0043750 A1 | 2/2008 | Keels et al. |
| 2008/0147822 A1 * | 6/2008 | Benhase et al. ............. 709/217 |

OTHER PUBLICATIONS

"Intel Virtual Interface (VI) Architecture Performance Suite User's Guide", Preliminary Version V0.3, Intel Corporation, Dec. 16, 1998, 28 pages.

Jinzanki, "Construction of Virtual Private Distributed System of Comet", RWC 2000 Symposium, Japan, XP002243009, Jan. 2000, pp. 1-3.

Pathikonda, et al., "Virtual Interface (VI) Architecture Overview", Enterprise Server Group, Intel Corporation, Apr. 1998, pp. 1-33.

Speight, et al., "Realizing the Performance Potential of the Virtual Interface Architecture", Proceedings of the 13th international conference on Supercomputing, Rhodes, Greece, 1999, pp. 184 -192.

Response to Non-Final Office Action received for U.S. Appl. No. 09/784,761, filed on Jul. 12, 2006, 35 pages.

Non-Final Office Action received for U.S. Appl. No. 09/784,761, mailed on Feb. 14, 2006, 19 pages.

Response to Non-Final Office Action received for U.S. Appl. No. 09/784,761, filed on Nov. 26, 2005, 34 pages.

Final Office Action received for U.S. Appl. No. 09/784,761, mailed on Jul. 29, 2005, 25 pages.

Response to Non-Final Office Action received for U.S. Appl. No. 09/784,761, filed on Apr. 19, 2005, 34 pages.

Non-Final Office Action received for U.S. Appl. No. 09/784,761, mailed on Feb. 14, 2005, 24 pages.

Response to Non-Final Office Action received for U.S. Appl. No. 09/784,761, filed on Sep. 29, 2004, 15 pages.

Non-Final Office Action received for U.S. Appl. No. 09/784,761, mailed on Jul. 12, 2004, 12 pages.

Non-Final Office Action received for U.S. Appl. No. 09/817,008, mailed on Jul. 9, 2004, 19 pages.

Response to Non-Final Office Action received for U.S. Appl. No. 09/817,008, filed on Nov. 4, 2004, 19 pages.

Non-Final Office Action received for U.S. Appl. No. 09/817,008, mailed on Nov. 18, 2005, 23 pages.

Response to Non-Final Office Action received for U.S. Appl. No. 09/817,008, filed on Apr. 18, 2006, 33 pages.

Final Office Action received for U.S. Appl. No. 09/817,008, mailed on Jul. 14, 2006, 7 pages.

Response to Final Office Action received for U.S. Appl. No. 09/817,008, filed on Nov. 14, 2006, 40 pages.

Non-Final Office Action received for U.S. Appl. No. 09/817,008, mailed on Feb. 09, 2007, 17 pages.

Response to Non-Final Office Action received for U.S. Appl. No. 09/817,008, filed on May 9, 2007, 5 pages.

Non-Final Office Action received for U.S. Appl. No. 09/817,008, mailed on Jul. 25, 2007, 19 pages.

Response to Non-Final Office Action received for U.S. Appl. No. 09/817,008, filed on Nov. 26, 2007, 21 pages.

Notice of Allowance received for U.S. Appl. No. 09/817,008, mailed on Mar. 28, 2008, 23 pages.

Amendment after Notice of Allowance received for U.S. Appl. No. 09/817,008, filed on April 2, 2008, 20 pages.

Non-Final Office Action received for U.S. Appl. No. 11/357,446, mailed on Jun. 3, 2008, 24 pages.

Response to Non-Final Office Action received for U.S. Appl. No. 11/357,446, filed on Nov. 10, 2008, 26 pages.

Final Office Action received for U.S. Appl. No. 11/357,446, mailed on Dec. 31, 2008, 22 pages.

Non-Final Office Action received for U.S. Appl. No. 11/315,685, mailed on Feb. 18, 2009, 25 pages.

Response to Non-Final Office Action received for U.S. Appl. No. 11/315,685, filed on Apr. 30, 2009, 22 pages.
Non-Final Office Action received for U.S. Appl. No. 11/357,445, mailed on August 4, 2008, 18 pages.
Response to Non-Final Office Action received for U.S. Appl. No. 11/357,445, filed on Nov. 7, 2008, 19 pages.
Final Office Action received for U.S. Appl. No. 11/357,445, mailed on Dec. 24, 2008, 19 pages.
Response to Final Office Action received for U.S. Appl. No. 11/357,445, filed on Mar. 4, 2009, 18 pages.
Non-Final Office Action received for U.S. Appl. No. 11/357,445, mailed on Apr. 24, 2009, 21 pages.
Non-Final Office Action received for U.S. Appl. No. 11/357,449, mailed on Jun. 4, 2009, 13 pages.
Non-Final Office Action received for U.S. Appl. No. 10/737,556, mailed on Jul. 6, 2004, 10 pages.
Supplemental Non-Final Office Action received for U.S. Appl. No. 10/737,556, mailed on Sep. 21, 2004, 8 pages.
Response to Supplemental Non-Final Office Action received for U.S. Appl. No. 10/737,556, filed on Oct. 12, 2004, 4 pages.
Non-Final Office Action received for U.S. Appl. No. 10/737,556, mailed on Jan. 26, 2005, 11 pages.
Response to Non-Final Office Action received for U.S. Appl. No. 10/737,556, filed on Apr. 19, 2005, 24 pages.
Final Office Action received for U.S. Appl. No. 10/737,556, mailed on Jul. 28, 2005, 19 pages.
Response to Final Office Action received for U.S. Appl. No. 10/737,556, filed on Nov. 26, 2005, 27 pages.
Non-Final Office Action received for U.S. Appl. No. 10/737,556, mailed on Feb. 14, 2006, 14 pages.
Response to Non-Final Office Action received for U.S. Appl. No. 10/737,556, filed on Jul. 12, 2006, 31 pages.
Notice of Allowance received for U.S. Appl. No. 10/737,556, mailed on Oct. 3, 2006, 12 pages.
Notice of Allowance received for U.S. Appl. No. 09/784,761, mailed on Oct. 6, 2006, 14 pages.
Mayo, John S., "The role of microelectronics in communication", Scientific American, Sep. 1977, pp. 192-209.
Warmke, Doug, "Building Up Chips Using VHDL and Synthesis", System Design, Dec. 1994/Jan. 1995, 7 pages.
Final Office Action received for U.S. Appl. No. 11/315,685, mailed on Aug. 11, 2009, 34 Pages.
Response to Non-Final Office Action received for U.S. Appl. No. 11/357,445, filed on Jul. 8, 2009, 18 Pages.
Response to Non-Final Office Action received for U.S. Appl. No. 11/357,449, filed on Aug. 17, 2009, 19 Pages.
Response to Final Office Action received for U.S. Appl. No. 11/315,685, filed on Sep. 17, 2009, 22 Pages.
Final Office Action received for U.S. Appl. No. 11/357,445, mailed on Sep. 10, 2009, 43 Pages.
Non-Final Office Action received for U.S. Appl. No. 11/356,493, mailed on Sep. 21, 2009, 26 Pages.
Response to Office Action received U.S. Appl. No. 11/357,445, filed on Nov. 10, 2009, 17 Pages.
Office Action received for U.S. Appl. No. 11/357,449, mailed on Nov. 18, 2009, 17 Pages.
Response to Office Action received for U.S. Appl. No. 11/356,493, filed on Nov. 17, 2009, 13 Pages.
Office Action received for U.S. Appl. No. 11/624,849, mailed on Nov. 23, 2009, 34 Pages.
Office Action received for U.S. Appl. No. 11/357,449, mailed on Dec. 21, 2009, 8 Pages.
Response to Office Action received for U.S. Appl. No. 11/357,449, filed on Dec. 8, 2009, 13 Pages.
Office Action received for U.S. Appl. No. 11/315,685, mailed on Jan. 4, 2010, 26 Pages.
Response to Office Action received for U.S. Appl. No. 11/624,849, filed on Jan. 22, 2010, 15 Pages.
Non-Final Office Action received for U.S. Appl. No. 11/356,493, mailed on Feb. 3, 2010, 12 pages.
Response to Office Action received for U.S. Appl. No. 11/357,449, filed on Mar. 4, 2010, 12 Pages.
Response to Office Action received for U.S. Appl. No. 11/315,685, filed on Mar. 5, 2010, 24 Pages.
Office Action received for U.S. Appl. No. 11/624,849, mailed on Mar. 10, 2010, 15 Pages.
Office Action received for U.S. Appl. No. 11/356,500, mailed on Mar. 18, 2010, 28 Pages.
Response to Office Action received for U.S. Appl. No. 11/624,849, filed on Mar. 31, 2010, 14 Pages.
Response to Office Action received for U.S. Appl. No. 11/356,493, filed on Apr. 2, 2010, 13 Pages.
Office Action received for U.S. Appl. No. 11/315,685, mailed on May 14, 2010, 34 Pages.
Office Action received for U.S. Appl. No. 11/356,500, mailed on Mar. 18, 2010, 28 Pages.
Response to Office Action received for U.S. Appl. No. 11/356,500, filed on May 17, 2010, 15 Pages.
Office Action received for U.S. Appl. No. 11/624,849, mailed on May 24, 2010, 11 Pages.
Notice of Allowance received for U.S. Appl. No. 11/357,449, mailed on Jun. 8, 2010, 13 Pages.

* cited by examiner

METHOD AND APPARATUS FOR USING A SINGLE MULTI-FUNCTION ADAPTER WITH DIFFERENT OPERATING SYSTEMS

BACKGROUND OF THE INVENTION

1. Field of the Invention
2. Description of the Related Art

In complex computer systems, particularly those in large transaction processing environments as shown in FIG. 1, the available servers 100 are often clustered together to improve overall system performance. Second, these clustered servers 100 are then connected by a storage area network (SAN) to storage units 106, so that all have high performance access to storage. Further, the servers 100 are also connected to an Ethernet network to allow the various user computers 110 to interact with the servers 100. Thus, the servers 100 use a first fabric 102 for clustering, a second fabric 104 for the SAN and a third fabric 108 to communicate with the users. In normal use the cluster fabric 102 is one such as InfiniBand, the SAN fabric 104 is one such as Fibre Channel and the user fabric 108 is one such as Ethernet. Therefore, in this configuration each of the servers 100 must have three different adapters to communicate with the three fabrics. Further, the three adapters take up physical space in a particular server, thus limiting the density of available servers in a high processor count environment. This increases cost and complexity of the servers themselves. Additionally three separate networks and fabrics must be maintained.

This is shown additionally in FIG. 2 where the software components are shown. An operating system 200 is present in the server 100. Connected to the operating system 200 is a clustering driver 202 which connects with an InfiniBand host channel adapter (HCA) 204 in the illustrated embodiment. The InfiniBand HCA 204 is then connected to the InfiniBand fabric 102 for clustering. A block storage driver 206 is connected to the operating system 200 and interacts with a Fibre Channel host bus adapter (HBA) 208. The Fibre Channel HBA 208 is connected to the Fibre Channel fabric 104 to provide the SAN capability. Finally, a networking driver 210 is also connected to the operating system 200 to provide the third parallel link and is connected to a series of network interface cards (NICs) 212 which are connected to the Ethernet fabric 108.

Legacy operating systems such as Linux 2.4 or Microsoft NT4 were architected assuming that each "I/O Service" is provided by an independent adapter. An "I/O Service" is defined as the portion of adapter functionality that connects a server onto one of the network fabrics. Referring to FIG. 2, the NIC 212 provides the Networking I/O Service, the HCA 204 provides the Clustering I/O Service, and the HBA 208 provides the Block Storage I/O Service. It would be desirable to allow a single ECA or Ethernet Channel Adapter to provide all three of these I/O Services. Since most traditional high performance networking storage and cluster adapters are PCI based and enumerated as independent adapters by the Plug and Play (PnP) component of the operating system, the software stacks for each fabrics have evolved independently. In order for an ECA to be deployed on such legacy operating systems, its I/O Services must be exported using independent PCI functions. While this type of design fits nicely into the PnP environment, it exposes issues related to shared resources between the PCI functions. For example, networking and storage may want to utilize a specific Ethernet port concurrently.

Modern operating systems such as Microsoft Windows Server 2003 provide a mechanism called a consolidated driver model, which could be used to export all ECA I/O Services using only a single PCI function. However, the software associated with the consolidated driver model has implicit inefficiencies due to the layers involved in virtualizing each I/O Service using host software. In some deployment environments, it may be desirable to support the consolidated driver model, but in environments that are sensitive to latency and CPU utilization it is desirable to deploy an ECA using multiple PCI functions.

Microsoft has made some progress in integrating networking and clustering using the Winsock Direct (WSD) model. One issue with WSD is that it does not export the various RDMA (Remote Direct Memory Access) APIs (Application Programming Interfaces), such as DAPL (Direct Access Provider Library) or MPI (Message Passing Interface), that have been widely accepted by the clustering community. One approach to exporting DAPL and MPI when not natively supported on an operating system is to use an independent PCI function for clustering. Another issue with WSD is that it is not deployed on all Microsoft operating systems, so hardware vendors cannot rely on it to export their adapter I/O services in all Microsoft operating system environments.

Future operating systems architectures will certainly start to take into account the unique characteristics of ECAs, e.g., multiple network ports and multiple I/O Services implemented in one adapter. Network ports, accelerated connections, and memory registration resources are all examples of resources that the operating system has an interest of managing in a way that is intuitive and in a way that takes the best advantage of the functionality provided by an ECA. This results in a very high probability for even more deployment models which would be desirable to support.

To address these various deployment models and yet provide the broadest use of a single ECA at its full capabilities it would be desirable to have an ECA that is able to adapt to each deployment model.

SUMMARY OF THE INVENTION

In a design according to the present invention, a flexible arrangement allows a single arrangement of ECA hardware functions to appear as needed to conform with various operating system deployment models. A PCI interface presents a logical model appropriate to the relevant operating system. Mapping parameters and values are associated with the packet streams to allow the packet streams to be properly processed according to the presented logical model and needed operations. The mapping arrangement allows different logical models to be presented and yet have only a single hardware implementation. Mapping occurs at both the host side and at the network side to allow the multiple operations of the ECA to be performed while still allowing proper delivery at each interface.

DETAILED DESCRIPTION OF THE PREFERRED EMBODIMENT

Figure 1:
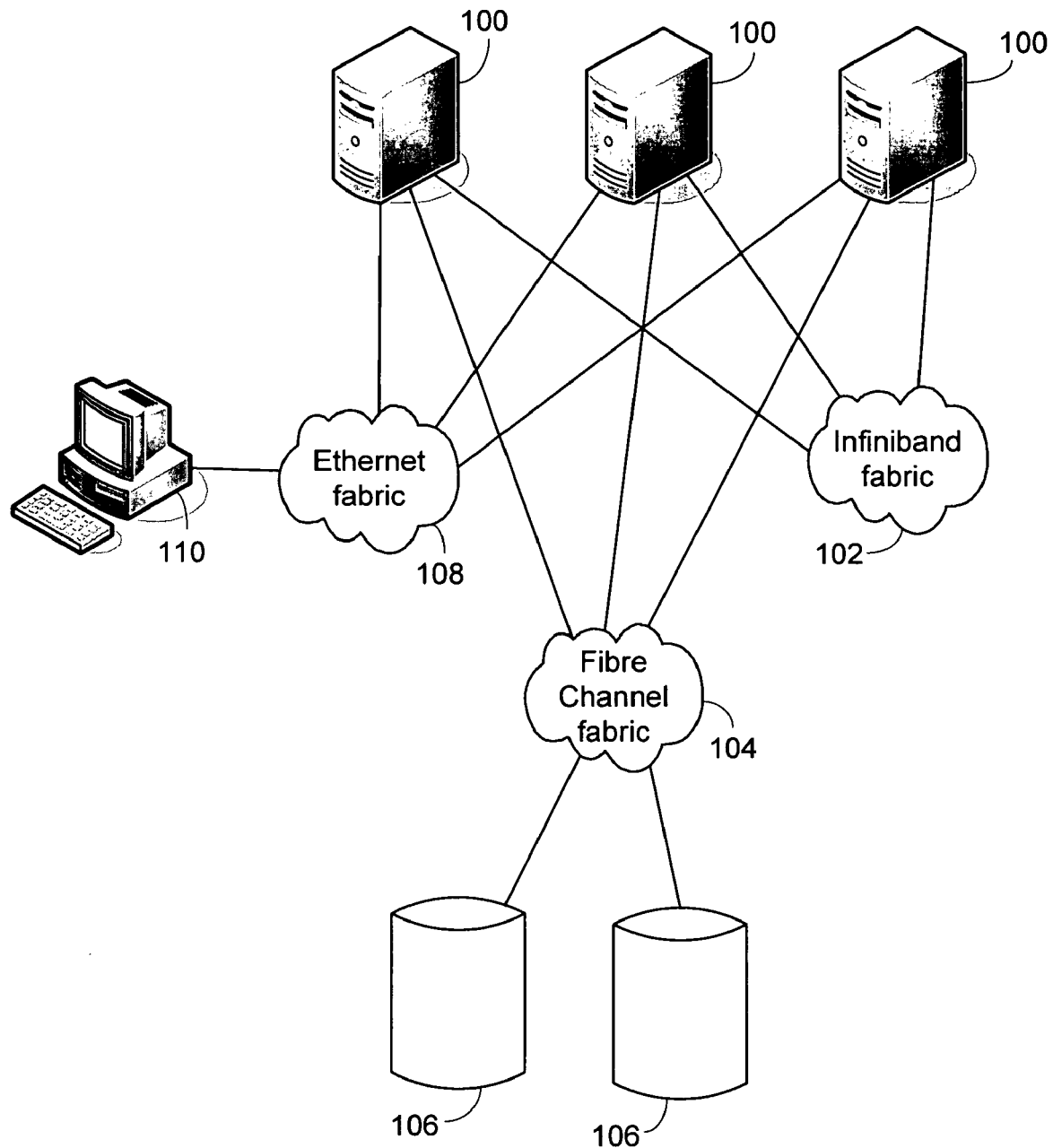
FIG. 1 is a block diagram of a computer system including clustering, user access and storage area networking according to the prior art.
Figure 3:
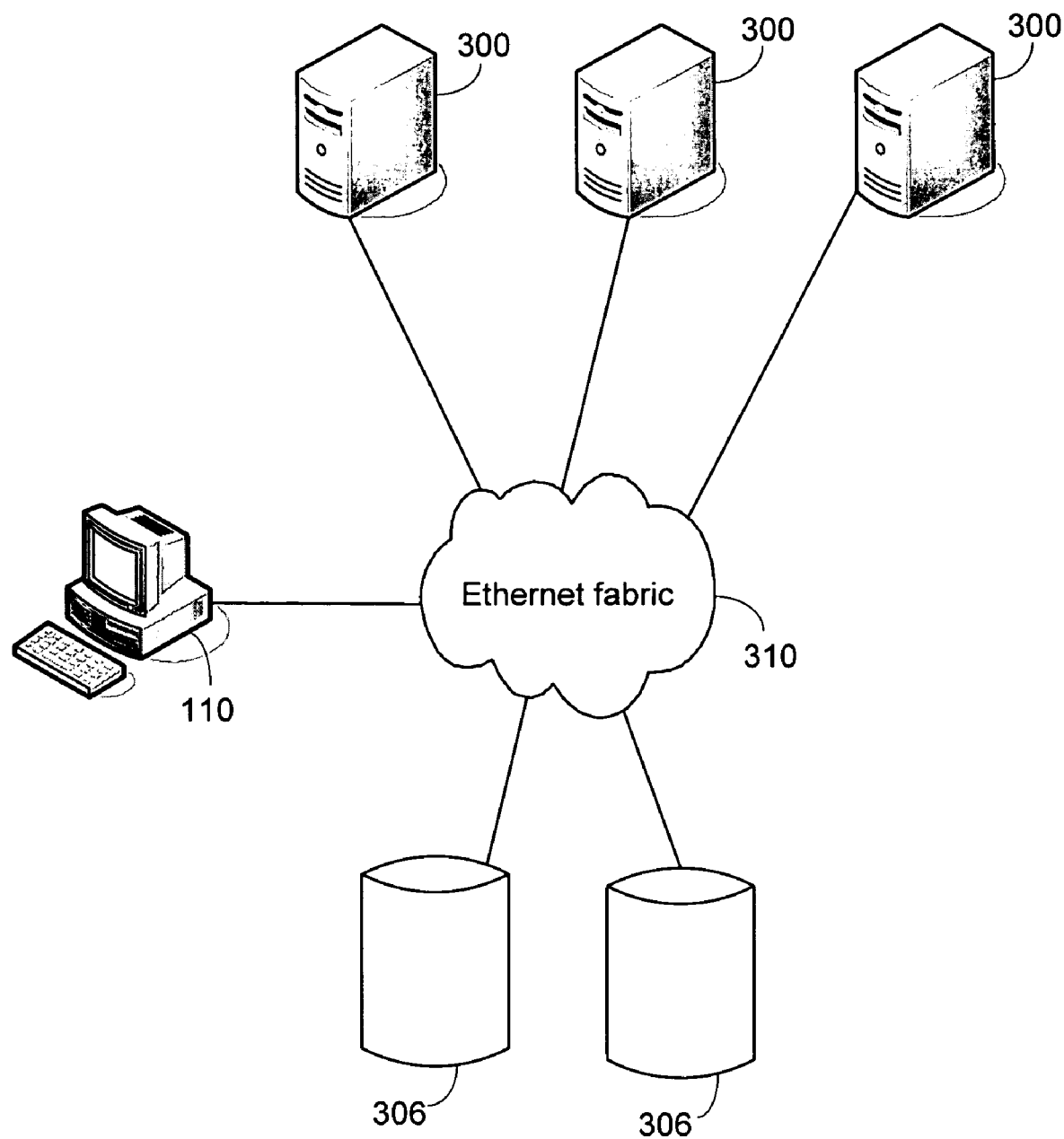
FIG. 3 is a block diagram of a computer system including servers, a user and storage connected by a single fabric according to the present invention.
Figure 4:
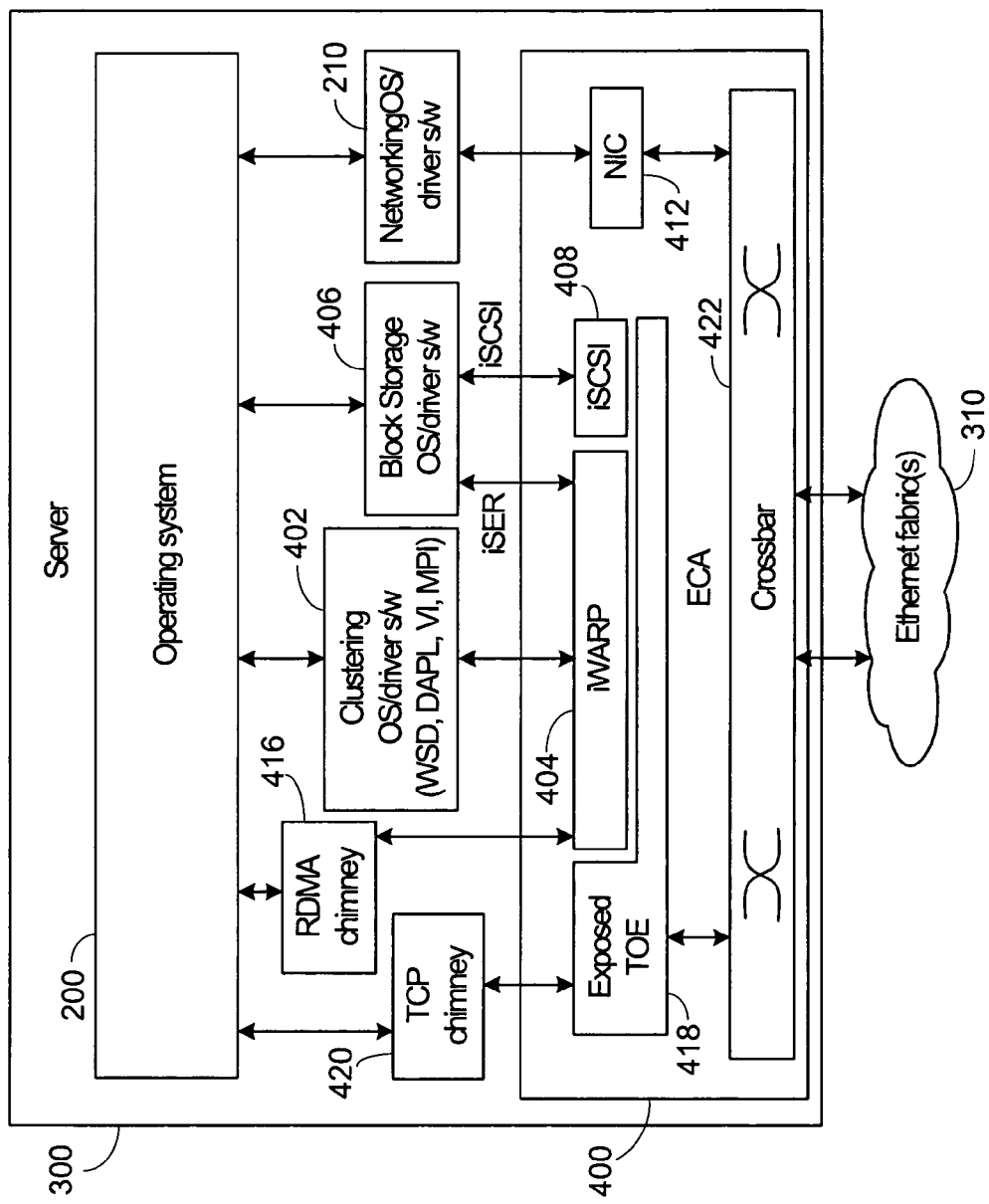
FIG. 4 is a logical block diagram of a server according to FIG. 3.

In the preferred embodiment as shown in FIG. 3, three servers 300 are connected to an Ethernet fabric 310. Preferably this is a higher performance Ethernet fabric 310 than the Ethernet fabric 108 as it is also used for storage area networking and clustering capabilities. As can be seen, there is logically only a single link to a single fabric in the system according to the preferred embodiment, though this may be any number of actual physical links. Storage units 306 are also directly connected to the Ethernet fabric 310. Further, a conventional user 110 is connected to the Ethernet fabric 310. Because only a single fabric 310 is utilized in the designs according to the preferred embodiment, significantly less maintenance and management is required than as in the prior art as shown in FIG. 1. To handle the three varying tasks, clustering, storage and user interface, the server 300 includes an Ethernet channel adapter (ECA) 400 (FIG. 4). This ECA 400 includes builtin capabilities to provide enhanced capabilities over current Ethernet fabrics. These enhancements include RDMA capability, particularly according to the iWARP standard, and iSCSI. iWARP is utilized in the clustering environment, whereas iSCSI is the standard for doing SANs using Ethernet.

Figure 2:
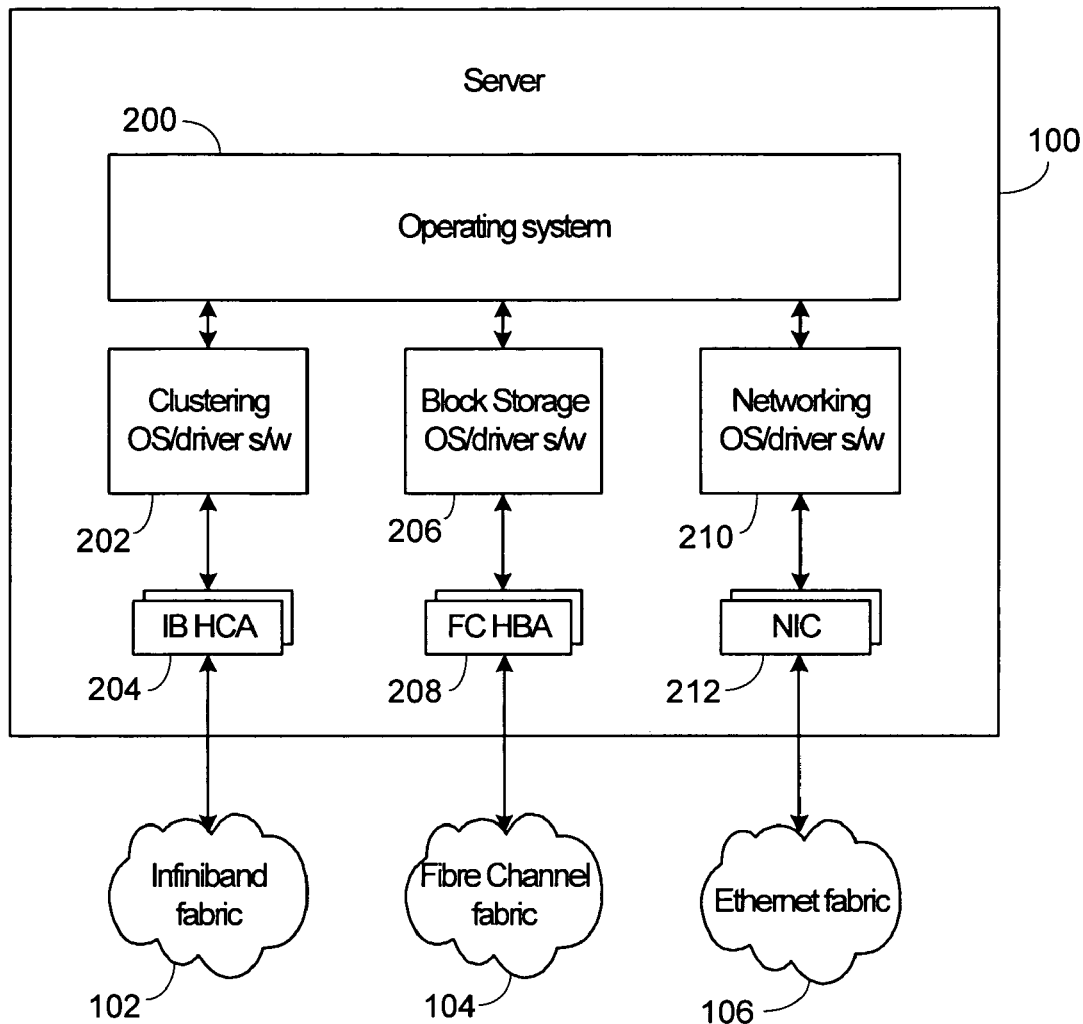
FIG. 2 is a block diagram showing the logical arrangement of a server in the system according to FIG. 1.

Referring to FIG. 4, the server 300 according to the preferred embodiment includes an operating system 200 as in the prior art. It similarly contains a networking driver 210, which is connected to a NIC 412. A block storage driver 406 is also connected to the operating system. It differs slightly from that used in FIG. 2 because in this case it is an iSCSI driver, as opposed to the Fibre Channel driver utilized in FIG. 2. The driver 406 communicates with iSCSI hardware 408 present in the ECA 400. A clustering driver 402 is also slightly different in that it utilizes RDMA capabilities and complies with the iWARP standard. To that end it is connected to an iWARP module 404 in the ECA 400. An RDMA chimney 416 according to the Microsoft Scalable Networking Initiative is present for appropriate Microsoft operating systems to interact with the iWARP module 404 and the operating system 200 to provide improved RDMA capabilities. Because both the iSCSI storage function and the clustering iWARP function need to be very high performance, a TCP offload engine (TOE) 418 is provided to connect to the iWARP module 404 and the iSCSI module 408. Further, a TCP chimney 420, also according to the Microsoft Scalable Networking Initiative, is present for appropriate Microsoft operating systems and is connected to the TOE 418. Both the TOE 418 and the NIC 412 are connected to an Ethernet crossbar switch 422 contained in the ECA 400 to allow flexibility of the various connections to the Ethernet fabric 310.

Figure 5:
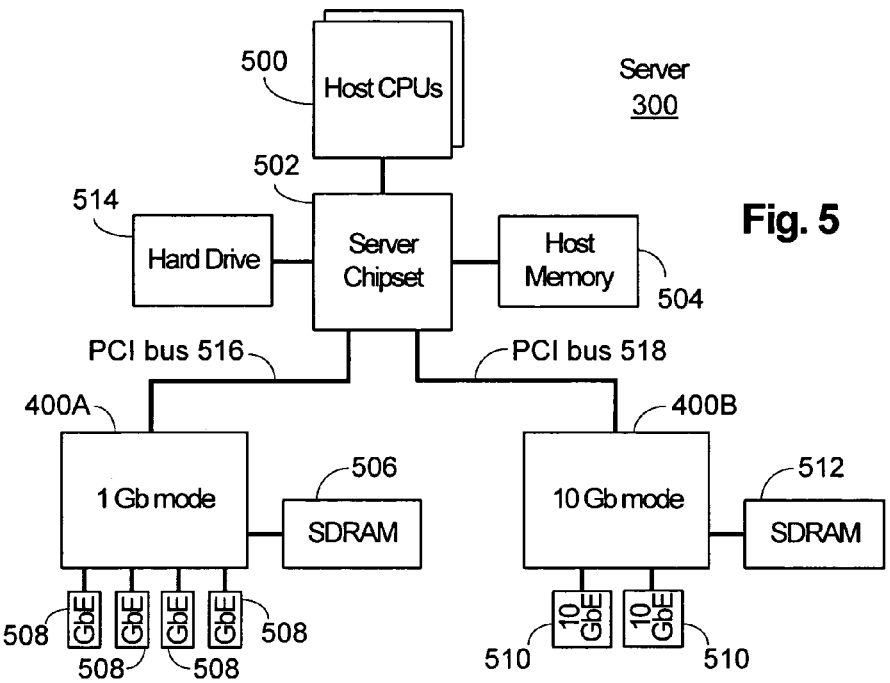
FIG. 5 is a block diagram of the various components of a server of FIG. 3.

Referring then to FIG. 5, a simple block diagram of a server 300 is shown. The various host CPUs 500 are connected to a server chipset 502, which is also connected to server or host memory 504. A hard drive 514 is coupled to the server chipset 502 to provide storage of the operating system, device drivers and relevant programs. In the illustrated embodiment further connected to the server chipset 502 using a PCI bus 512, such as a PCI-X bus, is a first ECA 400A, which is shown to be operating in one Gb Ethernet mode. RAM 506 is connected to the ECA 400A to form temporary buffer storage. Four one Gb Ethernet ports 508 are connected to the ECA 400A to provide the actual output capability. In the illustrated embodiment a second ECA, in this case ECA 400B, is connected to the server chipset 502 using a PCI bus 514, such as a PCI-Express bus, and is operating in ten Gb Ethernet mode and includes a pair of ten Gb Ethernet ports 510. RAM 512 is also connected to ECA 400B to provide buffers for its various functions.

Figure 6:
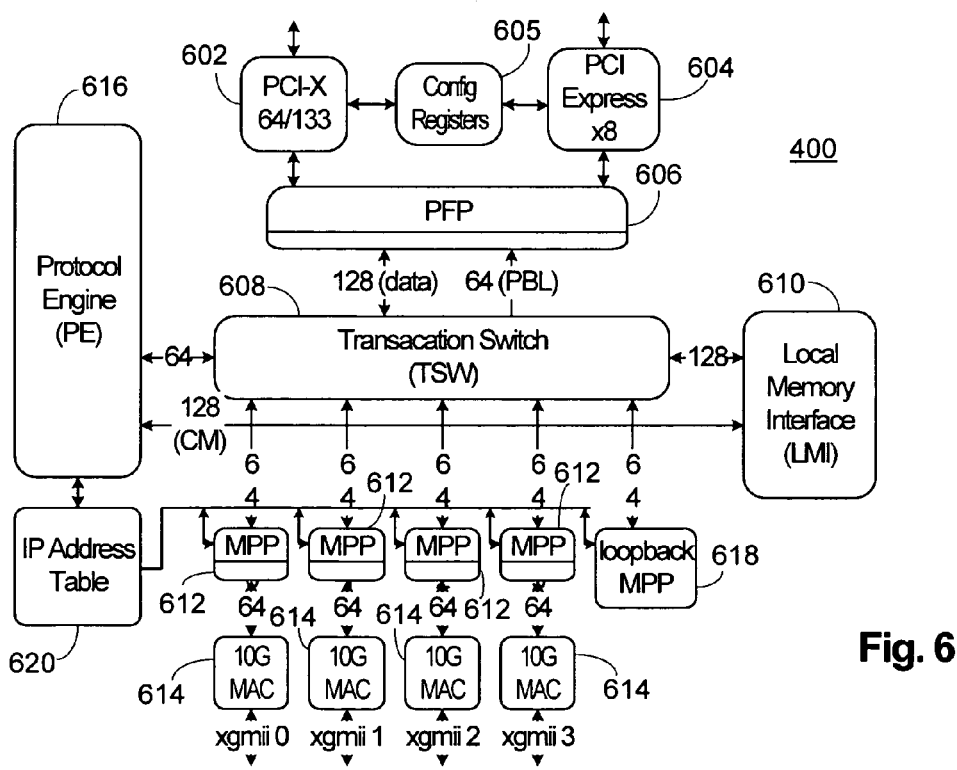
FIG. 6 is a high level block diagram of an Ethernet channel adapter (ECA) of FIG. 5 according to the preferred embodiment.

Referring then to FIG. 6, a block diagram of the ECA 400 according to the preferred embodiment is shown. Various server bus interfaces 602 and 604, such as PCI-X or PCI-Express, are shown to provide connections to the server chip set 502. A set of configuration registers 605 is connected to the server bus interfaces 602 and 604 to present the ECA 400 to the appropriate bus as more fully described below. The server bus interfaces 602 and 604 are connected to a PCI frame parser (PFP) 606. The PFP 606 interfaces the host CPUs 500 into a transaction switch 608. In the preferred embodiment the internal architecture of the ECA 400 is based on serial data packet flows and the transaction switch 608 is used to connect the various internal blocks of the ECA 400 as well as providing the crossbar 422 Function. For example, one of these blocks is a local memory interface 610. This is where the RAM 506 or 512 is connected to allow storage of data being received and transmitted. A series of MAC packet parsers (MPP) 612 are provided to parse data being received from the Ethernet fabric 310. These are also connected to the transaction switch 608 to allow them to provide data to or retrieve data from the local memory interface 610 or the transaction switch 608. The various MPPs 612 are connected to the relevant Ethernet MACs 614 to provide the actual interface to the Ethernet fabric 310. A protocol engine (PE) 616 is connected to the transaction switch 608 and also has a direct connection to the local memory interface 610 to allow higher speed operation. The protocol engine 616 performs all the processing relating to the NIC, TOE, iSCSI and iWARP modules shown in the prior logical block diagram. A special loop-back MPP 618 is provided to allow improved switching capabilities inside the ECA 400. Finally, an IP address table 620 is present to provide the IP addresses utilized by the ECA 400 in its communications over the Ethernet fabric 310.

Figure 7:
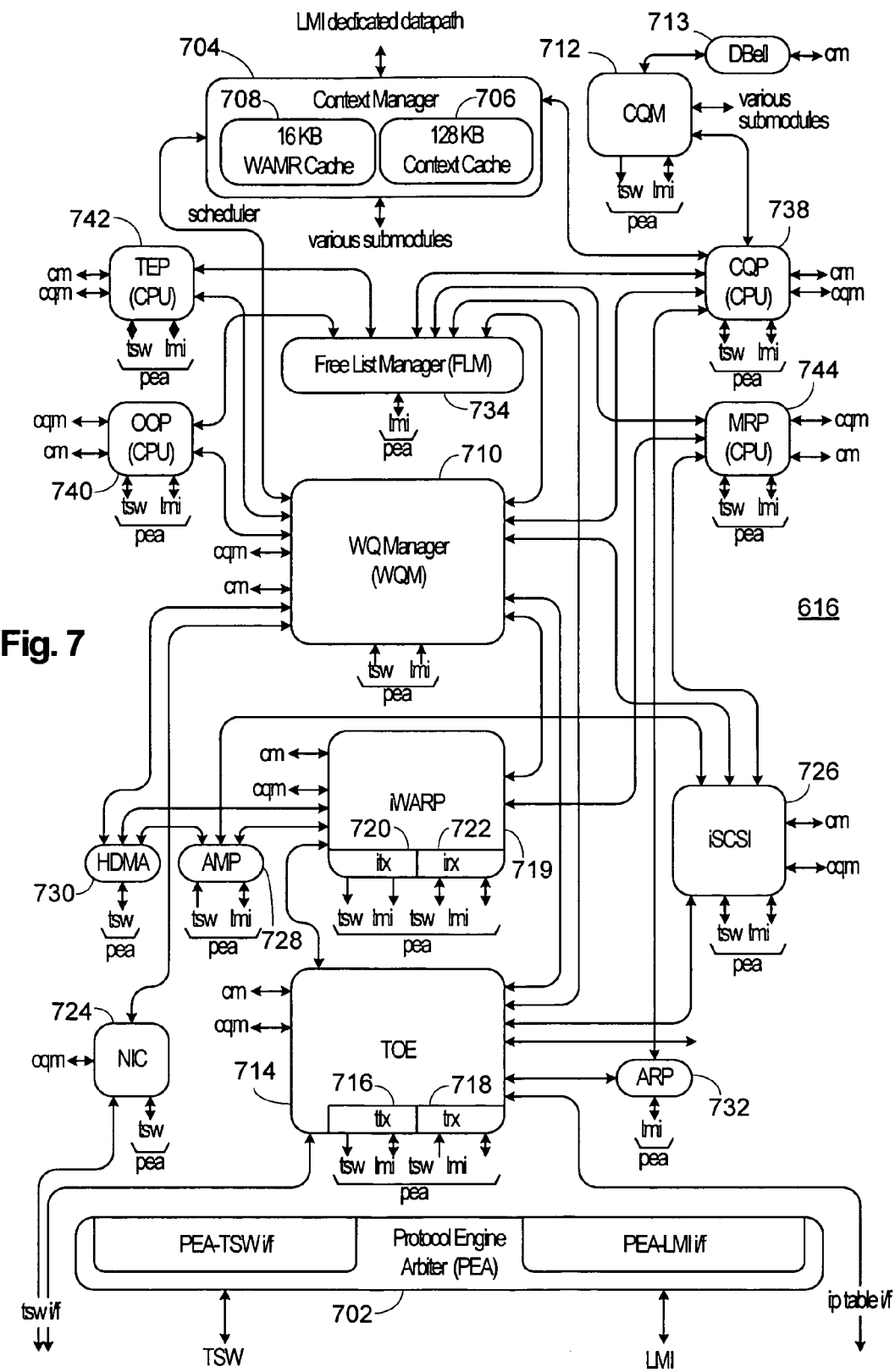
FIG. 7 is a block diagram of the protocol engine of the ECA of FIG. 6.

FIG. 7 illustrates the block diagram of the protocol engine 616 of the preferred embodiment. A protocol engine arbiter (PEA) 702 is connected to the transaction switch 608 and the local memory interface 610 to provide a point of contact between the protocol engine 616 and those devices. Various subcomponents of the protocol engine 616 have their access to those two devices arbitrated by the protocol engine arbiter 702 as indicated by arrows captioned by the relevant portions (tsw or lmi) of the protocol engine arbiter 702 adjacent a bracket labeled pea.

In basic operations, a series of tasks are performed by the various modules or sub-modules in the protocol engine 616 to handle the various iWARP, iSCSI and regular Ethernet traffic. A context manager 704 is provided with a dedicated datapath to the local memory interface 610. As each connection which is utilized by the ECA 400 must have a context, various subcomponents or submodules are connected to the context manager 704 as indicated by the arrows captioned by cm. Thus all of the relevant submodules can determine context of the various packets as needed. The context manager 704 contains a context cache 706, which caches the context values from the local memory, and a work available memory region cache 708, which contains memory used to store transmit scheduling information to determine which operations should be performed next in the protocol engine 616. The schedules are effectively developed in a work queue manager (WQM) 710. The WQM 710 handles scheduling for all transmissions of all protocols in the protocol engine 616. One of the main activities of the WQM 710 is to determine when data needs to be retrieved from the external memory 506 or 512 or from host memory 504 for operation by one of the various modules. The WQM 710 handles this operation by requesting a time slice from the protocol engine arbiter 702 to allow the WQM 710 to retrieve the desired information and place it in on-chip storage. A completion queue manager (CQM) 712 acts to provide task completion indications to the CPUs 500. The CQM 712 handles this task for various submodules with connections to those submodules indicated by arrows captioned by cqm. A doorbell submodule 713 receives commands from the host, such as "a new work item has been posted to SQ x," and converts these commands into the appropriate context updates.

A TCP off-load engine (TOE) 714 includes submodules of transmit logic 716 and receive logic 718 to handle processing for accelerated TCP/IP connections. The receive logic 716 parses the TCP/IP headers, checks for errors, validates the segment, processes received data, processes acknowledges, updates RTT estimates and updates congestion windows. The transmit logic 716 builds the TCP/IP headers for outgoing packets, performs ARP table look-ups, and submits the packet to the transaction switch 608. An iWARP module 719 includes a transmit logic portion 720 and a receive logic portion 722. The iWARP module 719 implements various layers of the iWARP specification, including the MPA, DDP and RDMAP layers. The receive logic 722 accepts inbound RDMA messages from the TOE 714 for processing. The transmit logic 720 creates outbound RDMA segments from PCI data received from the host CPUs 500.

A NIC module 724 is present and connected to the appropriate items, such as the work queue manager 710 and the protocol engine arbiter 702. An iSCSI module 726 is present to provide hardware acceleration to the iSCSI protocol as necessary.

Typically the host operating system provides the ECA 400 with a set of restrictions defining which user-level software processes are allowed to use which host memory address ranges in work requests posted to the ECA 400. Enforcement of these restrictions is handled by an accelerated memory protection (AMP) module 728. The AMP module 728 validates the iWARP STag using the memory region table (MRT) and returns the associated physical buffer list (PBL) information. An HDMA block 730 is provided to carry out the DMA transfer of information between host memory 504, via one of the bus interfaces 602 or 604, and the transaction switch 608 on behalf of the WQM 710 or the iWARP module 719. An ARP module 732 is provided to retrieve MAC destination addresses from an on-chip memory. A free list manager (FLM) 734 is provided to work with various other modules to determine the various memory blocks which are available. Because the data, be it data packets or control structures, is all contained in packets, a list of the available data blocks is required and the FLM 734 handles this function.

The protocol engine 616 of the preferred embodiment also contains a series processors to perform required operations, each processor including the appropriate firmware for the function of the processor. The first processor is a control queue processor (CQP) 738. The control queue processor 738 performs commands submitted by the various host drivers via control queue pairs. This is relevant as queue pairs are utilized to perform RDMA operations. The processor 738 has the capability to initialize and destroy queue pairs and memory regions or windows. A second processor is the out-of-order processor (OOP) 740. The out-of-order processor 740 is used to handle the problem of TCP/IP packets being received out-of-order and is responsible for determining and tracking the holes and properly placing new segments as they are obtained. A transmit error processor (TEP) 742 is provided for exception handling and error handling for the TCP/IP and iWARP protocols. The final processor is an MPA reassembly processor 744. This processor 744 is responsible for managing the receive window buffer for iWARP and processing packets that have MPA FPDU alignment or ordering issues.

The components and programming of the ECA 400 are arranged and configured to allow the ECA 400 to work with the known deployment models described above, including independent adapter, consolidated driver and Winsock Direct, and potential future deployment models. The ECA 400 can present itself on the PCI bus as one or many PCI functions as appropriate for the deployment model. The various I/O services, such as networking, clustering and block storage, can then be arranged in various manners to map to the presented PCI function or functions as appropriate for the particular deployment model. All of the services are then performed using the protocol engine 616 effectively independent of the deployment model as the various services are mapped to the protocol engine 616.

Prior to proceeding with the description, following are definitions of various terms.

Virtual Device: Generic term for the "I/O adapters" inside ECA 400. The ECA 400 of the preferred embodiments implements these virtual devices: four host NICs, which are connected to the operating system; 12 internal NICs, which are private or internal NICs that are not exposed to the operating system directly; four management NICs; one TCP Offload Engine (TOE); one iSCSI acceleration engine; and one iWARP acceleration engine.

I/O Service: One or more virtual devices are used in concert to provide the I/O Services implemented by ECA 400. The four major ECA 400 I/O Services are: Network, Accelerated Sockets, Accelerated RDMA, and Block Storage. A given I/O Service may be provided by different underlying virtual devices, depending on the software environment that ECA 400 is operating in. For example, the Accelerated Sockets I/O Service is provided using TOE and Host NIC(s) in one scenario, but is provided using TOE and Internal NIC(s) in another scenario. Virtual devices are often not exclusively owned by the I/O Services they help provide. For example, both the Accelerated Sockets and Accelerated RDMA I/O Services are partly provided using the TOE virtual device. The only virtual device exclusively owned is iSCSI, which is owned by Block Storage.

PCI Function: ECA 400 is a PCI multi-function device as defined in the PCI Local Bus Specification, rev 2.3. ECA 400 implements from one to eight PCI Functions, depending on configuration. Each PCI Function exports a group of I/O Services that is programmed by the same device driver. A PCI Function usually has at least one unique IP address and always has at least one unique MAC address.

Endnode: A virtual device or set of virtual devices with a unique Ethernet MAC address.

ECA Logical Model: The ECA Logical Model describes how ECA 400 functionality (e.g. Ethernet ports, virtual devices, I/O Services, etc) will be presented to end users. It is to be understood that certain aspects of the ECA Logical Model do not map directly and simply to the physical ECA 400 implementation. For example, there are no microswitches in the ECA 400 implementation.

Microswitches are virtual, and the transaction switch 608 implements their functionality. Further the ECA Logical Model is dynamic. For example, different software environments and different ECA 400 Ethernet port configurations will lead to different ECA Logical Models. Some of the things that can change from one ECA Logical Model to another: number of microswitches can vary from 1 to 4, number of active PCI Functions can vary from 1 to 8, number of I/O Services can vary from 1 to 7, and number of virtual devices can vary widely. Management and configuration software will save information in NVRAM that defines the Logical Model currently in use. Following are several examples of ECA Logical Models.

The following comments apply to any of the ECA Logical Models:

Each microswitch basically has the functionality of a layer 2 Ethernet switch. Each arrow connecting to a microswitch represents a unique endnode. The ECA 400 preferably comprises at least 20 unique Ethernet unicast MAC addresses as shown.

A microswitch is only allowed to connect between one active Ethernet port or link aggregated port group and a set of ECA 400 endnodes. This keeps the microswitch from requiring a large forwarding table, resulting in a microswitch being like a leaf switch with a single default uplink port. Inbound packets always terminate at one or more ECA 400 endnodes so that there is no possibility of switching from one external port to another. Outbound packets sent from one ECA 400 endnode may be internally switched to another ECA 400 endnode connected to the same microswitch. If internal switching is not required, the packet always gets forwarded out the Ethernet or uplink port.

Each Ethernet port has its own unique unicast MAC address, termed an ECA 400 "management MAC address". Packets using one of these management MAC addresses are always associated with a management NIC virtual device. Packets sent to these addresses will often be of the fabric management variety.

A box labeled "mgmt filter" within the microswitch represents special filtering rules that apply only to packets to/from the management NIC virtual devices. An example rule: Prevent multicast packets transmitted from a management NIC from internally switching.

Figure 8:
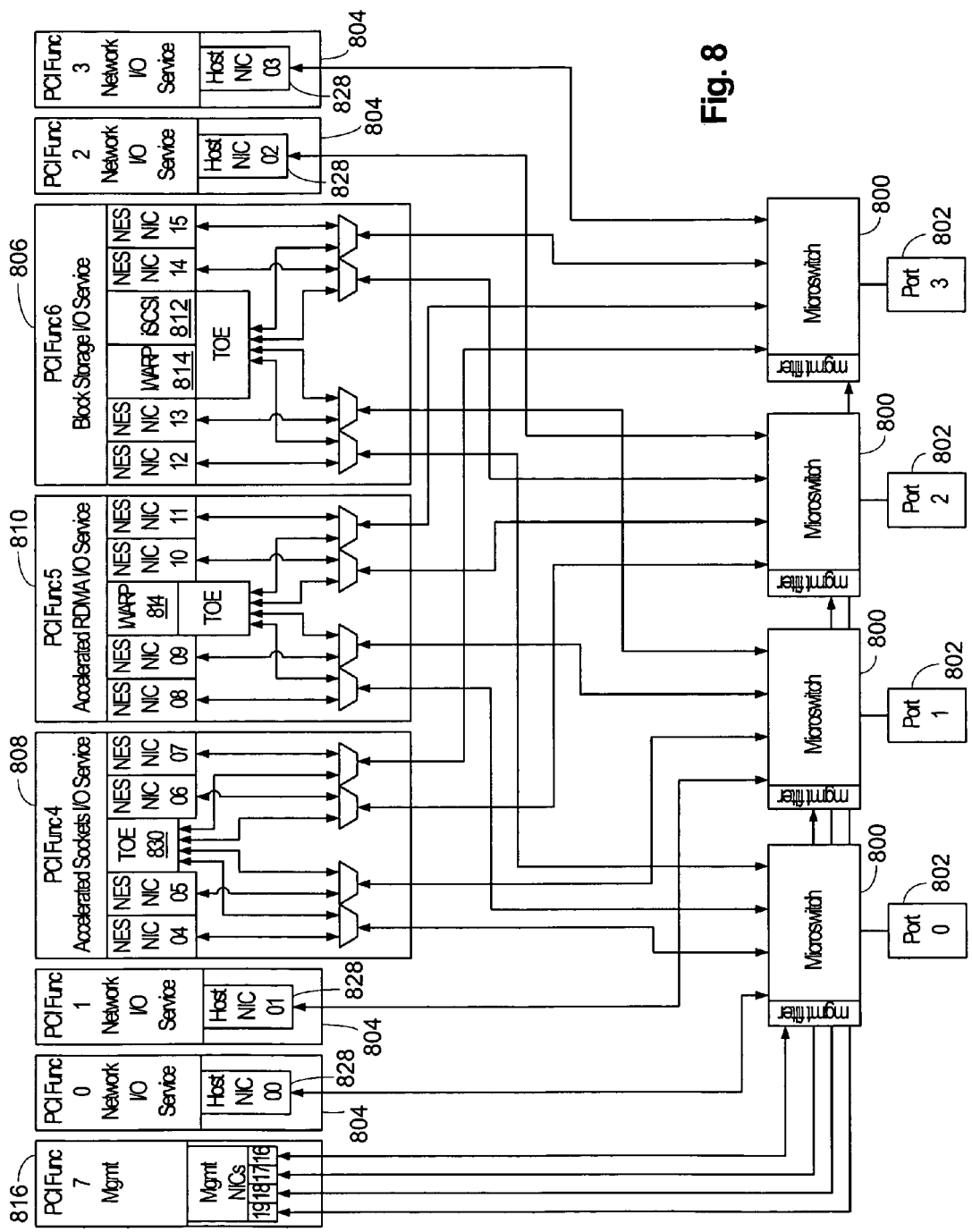
FIGS. 8-12 are block diagrams of logical models of an embodiment according to the present invention.

If there is a "mux" or multiplexer in an ECA Logical Model, this signifies packet classification. In FIG. 8, for example, the muxes associated with Block Storage, Accelerated Sockets, and Accelerated RDMA I/O Services represent the quad hash from the TCP and IP values. The quad hash is used to determine whether a given packet is accelerated or not, so that non-accelerated packets go to the connected NIC and the accelerated packets go to the connected TOE.

Each I/O Service is associated with an "affiliated NIC group". An "affiliated NIC group" always contains four NIC virtual devices. The number of active NIC virtual devices within an "affiliated NIC group" is always equal to the number of ECA 400 Ethernet ports in use. Organizing ECA 400 NIC virtual devices into "affiliated NIC groups" is useful because it helps determine which NIC should receive an inbound packet when link aggregation is active and because it helps prevent outbound packets from being internally switched in some cases.

Each accelerated I/O Service (Accelerated Sockets, Accelerated RDMA, and Block Storage) is associated with an "affiliated NIC group" because it provides a portion of its services using an "affiliated" TCP/IP stack running on the host or server. The "affiliated" TCP/IP stack transmits and receives packets on ECA 400 Ethernet ports via these affiliated NICs. There may be multiple TCP/IP stacks simultaneously running on the host to provide all of the ECA 400 I/O Services. The portion of services provided by an "affiliated" TCP/IP stack are:

Initiates TCP/IP connection: An affiliated TCP/IP stack is responsible for initiating each TCP/IP connection, and then notifying the ECA 400. Once notified, the ECA 400 will perform the steps required to transfer the connection from the host to the corresponding Accelerated I/O Service, and will then inform the host of the success or failure of the transfer in an asynchronous status message.

Performs IP fragment reassembly: the ECA 400 does not process inbound IP fragmented packets. Fragmented packets are received by their affiliated TCP/IP stack for reassembly, and are then returned to the ECA 400 for higher layer processing.

Processes fabric management, e.g. ARP or ICMP, messages.

This portion of services is algorithmically complex, subject to numerous interoperability concerns, is favored by Denial of Service (DoS) attackers, and does not require hardware acceleration to achieve good performance in typical scenarios. For these reasons, in the preferred embodiment, these functions are provided using a host software solution rather than on-board logic. It is understood that on-board logic could be utilized if desired.

All I/O Services transfer data between the ECA 400 and the host using the Queue Pair (QP) concept from iWARP verbs. While the specific policy called out in the iWARP verbs specification may not be enforced on every I/O Service, the concepts of submitting work and completion processing are consistent with iWARP verbs. This allows a common method for submitting and completing work across all I/O Services. The WQE and CQE format used on QPs and CQs across QPs on different I/O Services vary significantly, but the mechanisms for managing WQs (work queues) and CQs (completion queues) are consistent across all I/O Services.

The ECA 400 preferably uses a flexible interrupt scheme that allows mapping of any interrupt to any PCI Function. The common elements of interrupt processing are the Interrupt Status Register, Interrupt Mask Register, CQ, and the Completion Event Queue (CEQ). ECA 400 has sixteen CEQs that can be distributed across the eight PCI Functions. CEQs may be utilized to support quality of service (QOS) and work distribution across multiple processors. CQs are individually assigned to one of the sixteen CEQs under software control. Each WQ within each QP can be mapped to any CQ under software control. This model allows maximum flexibility for work distribution.

The ECA 400 has 16 special QPs that are utilized for resource assignment operations and contentious control functions. These Control QPs (CQPs) are assigned to specific PCI Functions. Access to CQPs is only allowed to privileged entities. This allows overlapped operation between verbs applications and time consuming operations, such as memory registration.

System software controls how the ECA 400 resources are allocated among the active I/O Services. Many ECA 400 resources can be allocated or reallocated during run time, including Memory Regions, PBL resources, and QPs/CQs associated with Accelerated I/O Services. Other ECA 400 resources, such as protection domains, must be allocated once upon reset. By allowing most ECA 400 resources to be allocated or reallocated during run time, the number of reboots and driver restarts required when performing ECA 400 reconfiguration is minimized.

As noted above, the ECA 400 allows I/O Services to be mapped to PCI Functions in many different ways. This mapping is done with strapping options or other types of power on configuration settings, such as NVRAM config bits. This flexibility is provided to support a variety of different operating systems. There are two major operating system types:

Unaware operating systems: In the context of this description, unaware operating systems are those that do not include a TCP/IP stack that can perform connection upload/download to an Accelerated Sockets, Accelerated RDMA, or Block Storage I/O Service. The TCP/IP stack is unaware of these various ECA 400 I/O Services. With such operating systems, the host TCP/IP stack is only used for unaccelerated connections, and one or more additional TCP/IP stacks, referred to throughout this description as internal stacks exist to perform connection setup and fabric management for connections that will use Accelerated I/O Services. For example, any application that wishes to use an Accelerated RDMA connection will establish and manage the connection through an internal stack, not through the host stack.

Aware operating systems: In the context of this description, aware operating systems are those that include a TCP/IP stack that can perform connection upload/download to one or more of: Accelerated Sockets, Accelerated RDMA, or Block Storage I/O Service, i.e. the TCP/IP stack is aware of these various I/O Services. Currently those operating systems are only from Microsoft. Future Microsoft operating systems will incorporate a TOE chimney or TOE/RDMA chimney, enabling connection transfer between the host TCP/IP stack and the Accelerated Sockets or Accelerated RDMA I/O Services. Typically the host TCP/IP stack is used to establish a connection and then the ECA 400 performs connection transfer to the Accelerated Sockets or Accelerated RDMA I/O Service. The advantage of this cooperation between the host stack and the ECA 400 is to eliminate the need for many or all of the internal stacks.

Each of the operating system types described above can be further classified by what driver model they support as described above. The two driver models are described below:

Independent Driver model: Legacy operating systems such as Windows NT4 typically support only this model. These operating systems require a separate, independent driver to load for each I/O Service. With this model, the I/O Service to PCI Function ratio is always 1:1.

Consolidated Driver model: Also known as a Bus Driver model. Newer operating systems such as Windows 2000 and to a greater extent Windows Server 2003 support this type of driver. Here a single operating system driver can control multiple I/O Services, which means that the I/O Service to PCI Function ratio can be greater than one.

All of the examples below in this section show one Ethernet port per microswitch. It is understood that the ECA 400 can be configured where there is more than one Ethernet port assigned per microswitch.

The first example is unaware operating systems, independent driver model and is shown in FIG. 8. This Logical Model uses at least 16 IP addresses when all ports 802 are active, with one IP address per I/O Service per active port. This programming model uses at least 20 MAC addresses, with five per active microswitch 800. There are four independent TCP/IP stacks running on the host in this environment: the host stack connected to the Network I/O Service 804, an internal stack connected to the Block Storage I/O Service 806, an internal stack connected to the Accelerated Sockets I/O Service 808, and an internal stack connected to the Accelerated RDMA I/O Service 810.

The Block Storage I/O Service 806 has access to both the iSCSI 812 and iWARP virtual devices 814, which allows it to support both iSCSI and iSER transfers.

If the host supports the simultaneous use of more than one RDMA API, VI and DAPL, then these APIs connect to the ECA 400 through a single shared PCI Function.

This model uses this fixed mapping between I/O Services and PCI Functions:
PCI Function 0,1,2,3=Network I/O Service 804
PCI Function 4=Accelerated Sockets I/O Service 808
PCI Function 5=Accelerated RDMA I/O Service 810
PCI Function 6=Block Storage I/O Service 806
PCI Function 7=Management NIC 816

It is understood that administration of a machine with multiple active TCP/IP stacks is more complicated than administration of a machine with a single active TCP/IP stack and that attempts to interact between stacks must use unconventional means to provide a robust implementation since no OS-architected method for interaction is available.

Thus the Logical Model according to FIG. 8 presents four virtual host NICs 828, a virtual TOE 830, a virtual iSCSI engine 812, a virtual iWARP unit 814 and a virtual management device 816. Each of the virtual devices is then connected to the virtual microswitches 800, which in turn are connected to ports 802. The devices are virtual because, as shown in FIGS. 6 and 7, no such devices actually exist, only the devices shown in those Figures. However, the ECA 400 presents these virtual devices to conform to the requirements of the unaware operating system, independent driver deployment situation. These virtual devices are configured as appropriate to provide the desired I/O service or function, such as Network I/O Services 804, Block Storage I/O Services 806, RDMA I/O Service 810 and Accelerated Sockets I/O Service 808.

Figure 9:
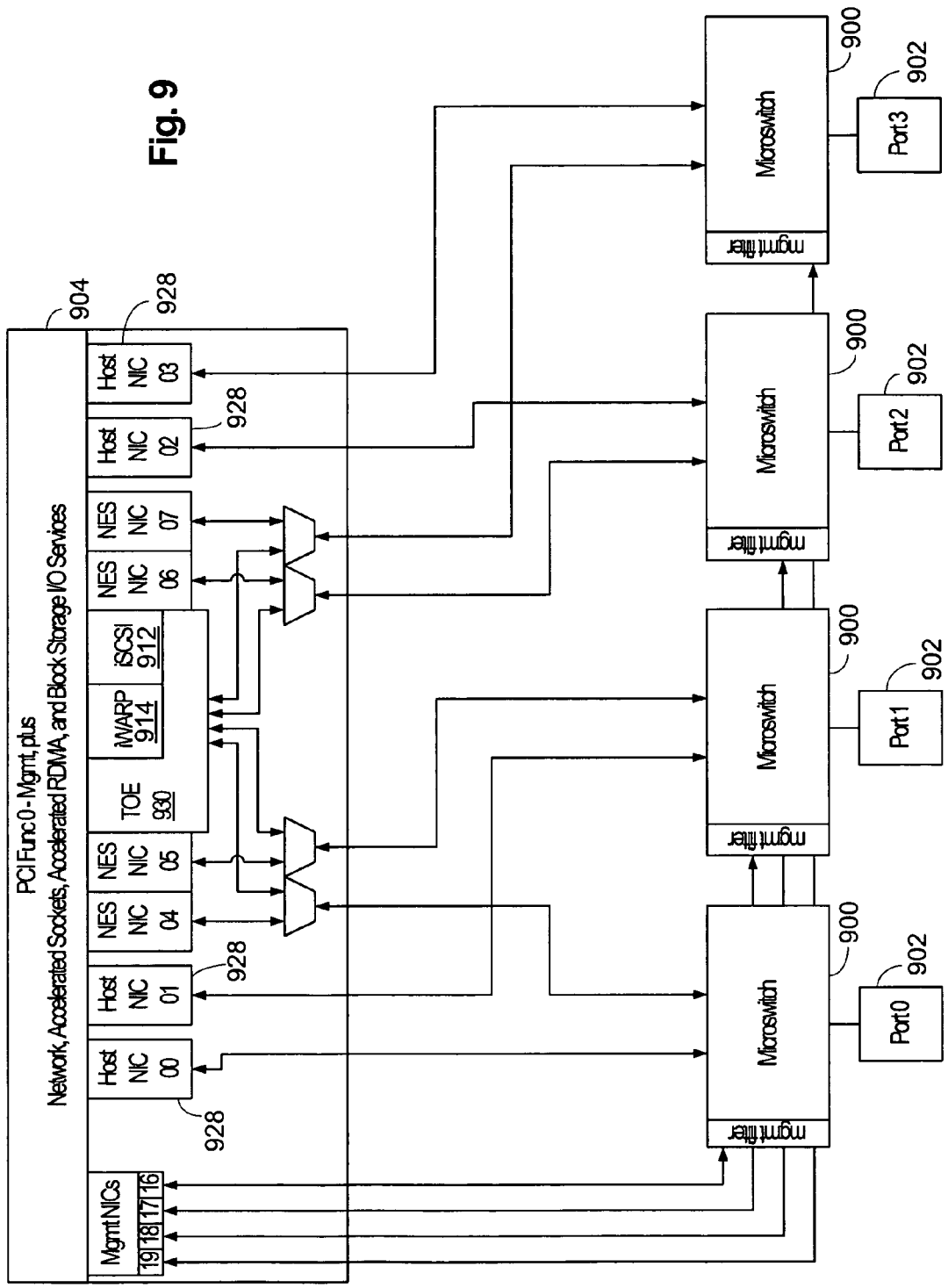

The second example is the unaware operating systems, consolidated driver model as shown in FIG. 9. For simplicity only the differences from the "unaware operating system, independent driver" logical model are discussed here.

All I/O Services plus ECA 400 management can be programmed via a common PCI Function. For some operating systems, the Block Storage I/O Service might continue to require its own PCI Function.

By consolidating the Accelerated Sockets, Accelerated RDMA, and Block Storage I/O Services under a common PCI Function, I/O Services are able to share a common internal stack. Since only two stacks are used, the used number of IP addresses can be reduced from 16 to 8. Further, eight Internal NICs are not used, reducing the required number of MAC addresses from 20 to 12.

This model uses this fixed mapping between I/O Services and PCI Functions: PCI Function 0=Management network, Accelerated Sockets, Accelerated RDMA and Block Storage I/O Service.

The operating system software overhead is higher in this model as discussed above, especially in the interrupt distribution area. The device driver portion of the bus model is also more complicated to implement than legacy device drivers.

The virtual devices presented in the Logical Model according to FIG. 9 are slightly different from those presented according to FIG. 8. According to FIG. 9, only a single virtual device is presented to the operating system. Here, however, the virtual devices of host NICs 928, TOE 930, iWARP engine 912, and iSCSI engine 912 are configured for one combined I/O Service 904 which handles block storage, RDMA, accelerated sockets and normal network operations.

Figure 10:
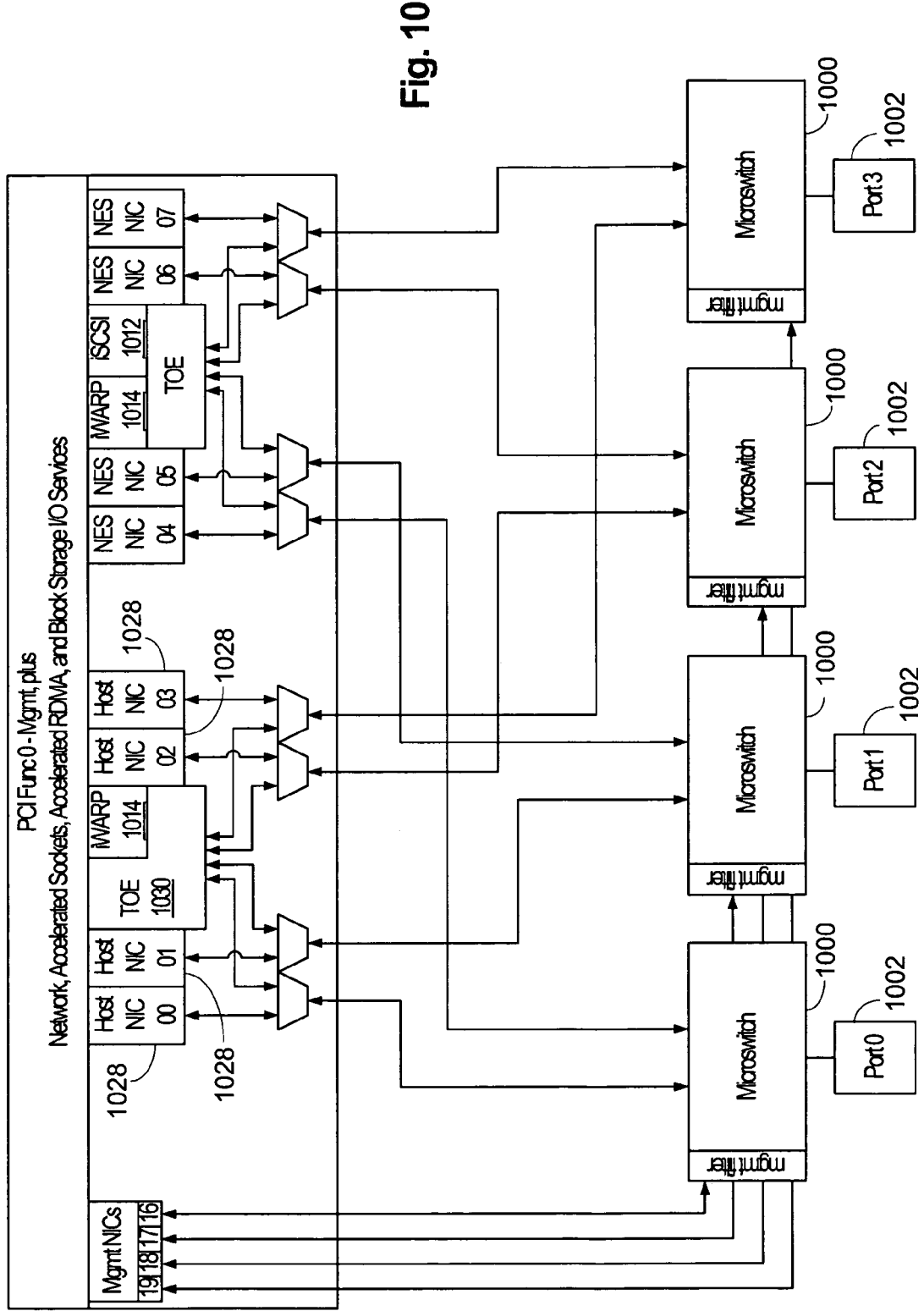

The third model is the aware operating system, consolidated driver model and is shown in FIG. 10. Again for simplicity only the differences from unaware operating system, consolidated driver logical model are described.

With the operating system aware, the host NICs and host TCP/IP stack can be used to set up accelerated TOE and iWARP connections. An internal stack is present to supply the Block Storage I/O Service and may be used to supply the Accelerated RDMA I/O Service as well, for those RDMA APIs that are not native to the operating system. For example, the DAPL API will not be native to the Microsoft chimney-enabled operating system. The used number of IP addresses is eight. The used number of MAC addresses is 12

The Logical Model according to FIG. 10 presents slightly different virtual devices from that of FIG. 9 as a second iWARP engine 1014 is presented. Here again a consolidated I/O service is provided.

The Windows Sockets Direct API model has two variations.

As common background, WSD requires a SAN NIC to support both accelerated RDMA-enabled traffic and unaccelerated host TCP/IP traffic. The SAN NIC accomplishes this by providing a normal NDIS driver interface for connection to the host TCP/IP stack and by providing a proprietary interface to the WSD Provider or SAN Provider and the WSD Proxy or SAN Management Driver for SAN services.

WSD allows for each SAN NIC to connect to a fabric that contains some IP subnets that are RDMA-enabled, and some that are not. For example, on an InfiniBand SAN, there might be an IP over IB gateway that connects the SAN to an Ethernet network that is reachable only via the SAN. Also for example, on an iWARP SAN, there might be some subnets that do not have ECA 400 adapters, but rather are connected using ordinary Ethernet NICs.

The Windows Sockets Switch keeps a list of IP subnets that are RDMA-enabled. When both endnodes in a sockets session are not RDMA-enabled, or are not on the same IP subnet, or if the session is not using TCP transport, then the Windows Sockets Switch implements the session using the host TCP/IP stack. Only when both endnodes in a sockets session are RDMA-enabled, and on the same IP subnet, and when the session is using TCP transport, will the Windows Sockets Switch implement the connection using the WSD Provider path. The concern here is that there will be a combination of accelerated and unaccelerated traffic on the RDMA-enabled IP subnets of the SAN.

In one implementation the WSD proxy driver includes an internal stack for initiation of accelerated connections etc. The WSD architecture assumes that the SAN fabric does not use IP addressing, and that a translation from IP addresses to SAN addresses is required. The translation is expected to take place in the NIC driver for unaccelerated traffic, and in the WSD Proxy Driver for accelerated traffic. Of course, this assumption is not correct for the ECA 400. The ECA 400 NIC driver does not require address translation capability. However, a translation is still required for accelerated traffic, so that accelerated traffic can be distinguished from unaccelerated traffic on the RDMA-enabled IP subnets of the SAN. This translation is carried out in the WSD Proxy Driver.

Figure 11:
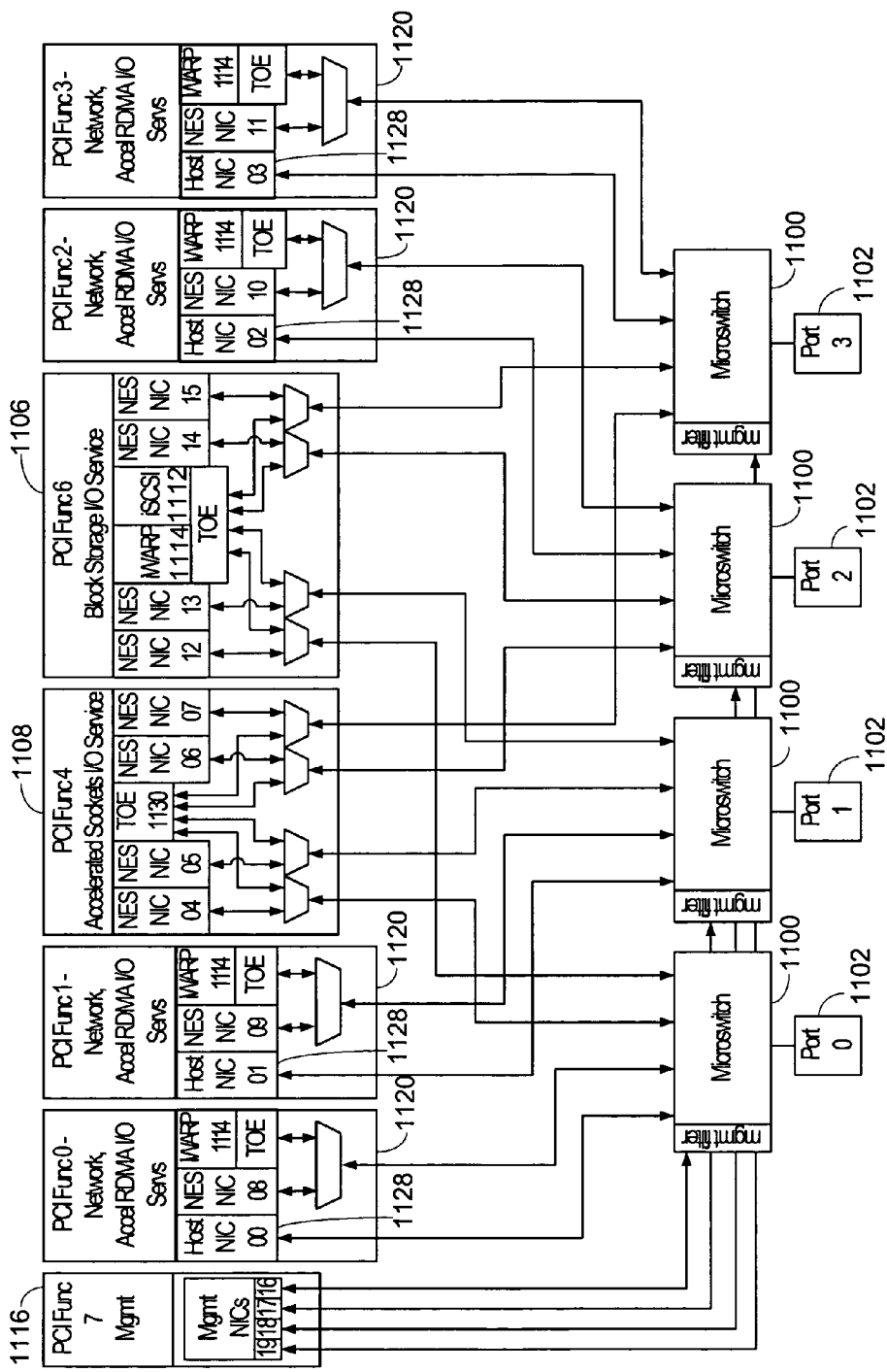

FIG. 11 shows the unaware operating system, independent driver Logical Model modified to support Windows Sockets Direct. PCI Functions 0 to 3 appear to the operating system as SAN NICs. PCI Functions 4 and 6 continue to provide Accelerated Sockets and Block Storage I/O Services 1106.

According to the Logical Model of FIG. 11, multiple iWARP engines 1114 are presented, one associated with each host NIC 1128, as accelerated RDMA Network I/O Services are provided.

Figure 12:
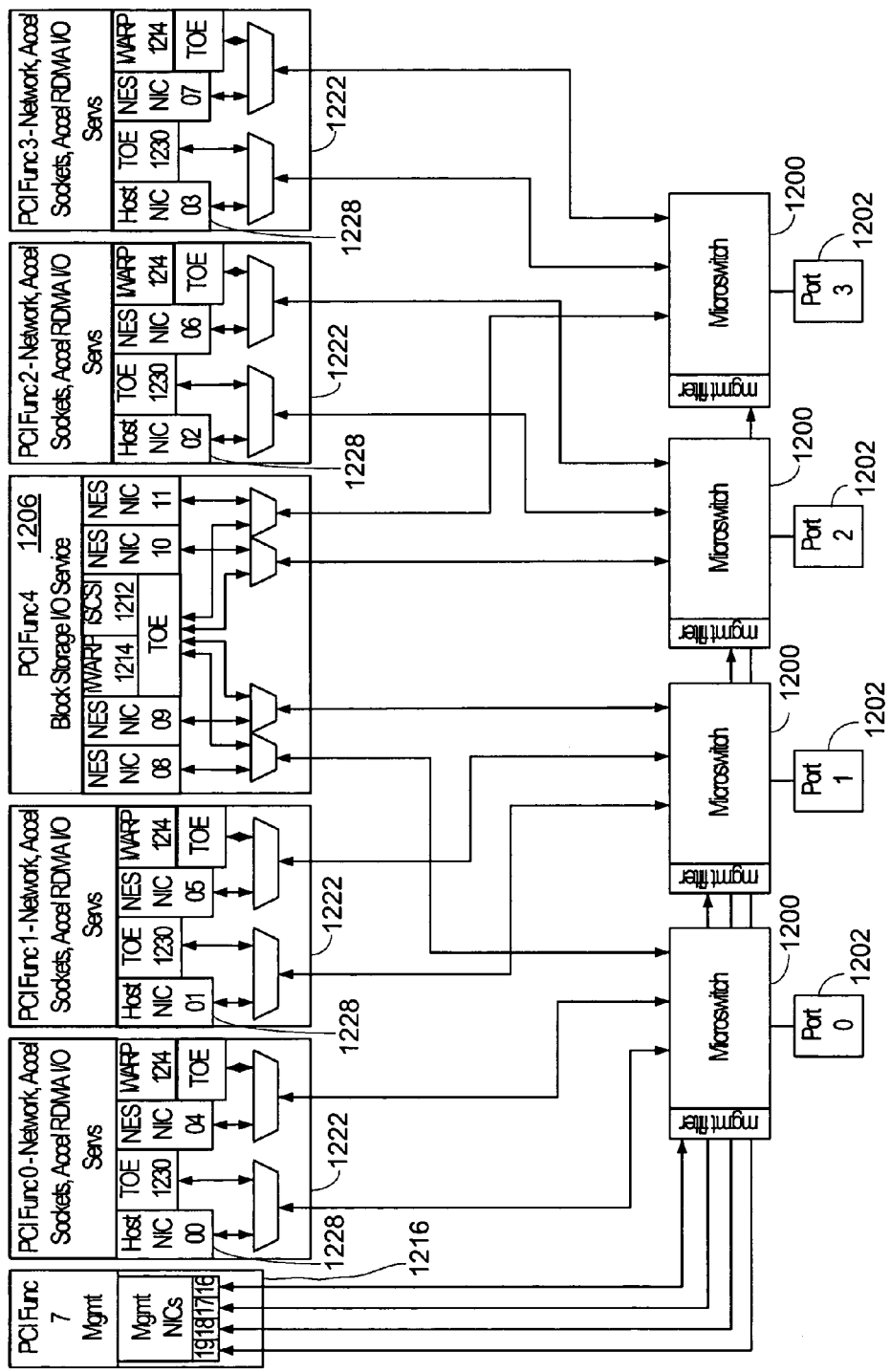

FIG. 12 shows the aware operating system, independent driver Logical Model modified to support the Microsoft TCP Chimney and Windows Sockets Direct. PCI Functions 0 to 3 appear to the operating system as SAN NICs augmented with TCP Chimney capability. PCI Function 4 provides Block Storage I/O Service 1206.

FIG. 12 shows a different Logical Model and combination of virtual devices, this time presenting a TOE 1230 with each host NIC 1228 and iWARP engine 1214 with an associated NES NIC. Together this combination of virtual devices provides combined accelerated sockets, Accelerated RDMA, and network I/O services.

ECA 400 configuration software uses silicon capabilities combined with user input to configure which PCI functions to enable and which I/O Services are mapped to which enabled PCI functions. This configuration information, termed "EEPROM Boot-up Register Overrides", is stored in the ECA 400 EEPROM (not shown). Upon hard reset, the ECA 400 automatically reads this configuration information out of EEPROM, and applies it to the ECA 400 PCI configuration space registers. Typical registers that require EEPROM Boot-up Register Override include Device ID, Class Code, Subsystem Vendor ID, Subsystem ID, Interrupt Pin, and Config Overrides.

During reset initialization, the ECA 400 decides which PCI functions to enable using information stored in the "Config Overrides" PCI Configuration register. When a given PCI function is not enabled, then attempts to access its config space will result in master abort.

Thus the variation between Logical Models of the ECA 700 can be seen. The configuration registers 605 are configured to present the appropriate Functions or I/O Services, and their related register sets, to the PCI bus. For example, eight separate Functions are presented in FIG. 8 instances while one combined Function is presented for FIG. 10 instances.

As the protocol engine 616 is a single unit, mapping values inside the protocol engine 616 are used to associate I/O Services and related virtual devices to the exposed PCI Functions. Exemplary mapping values include the NIC or NICs associated with a given MAC address, the outcome of the quad hash function, and connection context fields including protocol, such as iSCSI, iWARP, etc.; a value designating the responsible NIC; and the relevant PCI Function. A given NIC is only a virtual or logical construct inside the protocol engine 616, as only one actual hardware grouping is provided to do each function.

Each packet received from the Ethernet fabric 310 is identified using its destination MAC address, quad, and other packet header fields with a set of mapping values managed by the protocol engine, which determine the Virtual Device(s) that will perform processing on the packet and the I/O Service and PCI function the packet is affiliated with. The protocol engine 616 uses the mapping values to transfer relevant portions of this packet across the PCI interface 602 or 604 and into host memory 504 using the proper PCI Function. In the preferred embodiment the ECA 400 supports the programming of any I/O Service and any Virtual Device from any PCI Function. When drivers load, they learn through configuration parameters which I/O Services and Virtual Devices are configured as active on their PCI function and restrict themselves to programming only these I/O Services and Virtual Devices. When a driver posts a new command to the adapter, mapping values inside the protocol engine 616 are used to associate each command with the appropriate I/O Service, Virtual Device(s) and an Ethernet port. This enables the protocol engine 616 to determine the correct sequence of Virtual Devices that must process the command in order to carry it out. When processing a command involves transmission of packets, the packets are transmitted on the Ethernet port defined by said mapping values. The mapping values are chosen and resulting values are sufficiently flexible to allow handling of the various instances described above and others that will arise in the future.

As an example, consider the logical model of FIG. 8, and specifically PCI Function 6. The configuration parameters typically include standard PCI configuration space register fields Vendor ID, Device ID, Revision ID, Class Code, Subsystem Vendor ID, and Subsystem ID and may include additional fields. In the preferred embodiment most of the standard PCI configuration space register fields can be modified by user configuration software to suit the particular logical model desired, while keeping said fields as "read only" from the perspective of the host driver. In this example, the driver loaded by the operating system on PCI function 6 uses the configuration parameters to determine that it is to provide the Block Storage I/O service and has been allocated a set of virtual devices (NES NICs 12-15, iWARP, iSCSI and TOE) to do so. This set of virtual devices enables the driver to transmit and receive block storage traffic on any Ethernet port of the device, but in this example storage traffic is configured as best provided on port 2.

Each I/O Service has one or more dedicated host memory 504 work queues (not shown in FIG. 8) for posting driver commands to the ECA 400. When the driver posts a command for transmission of block storage traffic, the mapping values enable the protocol engine 616 to know, for example, that all commands posted to a given work queue are associated with PCI Function 6, Block Storage I/O Service, iWARP virtual device 814, the TOE virtual device, and Ethernet port 2 802. This knowledge of Virtual Devices enables the protocol engine 616 to determine the correct sequence of submodules to carry out the command, which in this case would be WQM 710, then ITX 720, then TTX 716. Each work queue has independent mapping values. The mapping values enable the protocol engine 616 to interpret any posted command in the context of the configured Logical Model, and to carry out packet generation stipulated by the command using the correct set of Virtual Device(s) and Ethernet port.

When a packet is received at Ethernet port 2 802, the ECA 400 uses its header fields to identify it with a set of mapping values. In this case a first packet's header fields might identify it with mapping values that affiliate the packet with PCI Function 6, Block Storage I/O Service, NES NIC 14. A second packet's header fields might identify it with mapping values that affiliate the packet with PCI Function 6, Block Storage I/O Service, TOE virtual device, and iWARP virtual device 814. This knowledge of Virtual Devices enables the protocol engine 616 to determine the correct sequence of submodules to carry out packet processing, which for second packet would be TRX 718, then IRX 722, then WQM 710, then CQM 712. The mapping values enable the protocol engine 616 to interpret any received packet in the context of the configured Logical Model, to carry out received packet processing using the correct set of Virtual Device(s), and to transfer relevant portions of this packet across the PCI interface 602 or 604 using the proper PCI Function.

Had the same packet stream going to the same storage device be provided in a case according to FIG. 10, the mapping values are different to provide for only PCI Function 0 being identified. However, the mapping values would still identify the various logical components that are relevant to simplify tracking and sharing of the resources on the ECA 400.

By having the mapping capability and the flexibility in the mapping capability and the various internal components, numerous operating system deployment models can be handled by a single ECA 400. This flexibility allows maximum usage of the ECA 400 in the maximum number of environments without requiring different ECAs or major user reconfiguration.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

The invention claimed is:

1. An apparatus comprising:
an input/output adapter to be connected to a network and to a host interface of a host computer, the adapter including capabilities, the host computer comprising a host central processing unit and being capable of using a plurality of operating systems that have techniques to interface with the capabilities, the adapter including function blocks to provide the capabilities, the adapter also including network ports to be connected to the network and being coupled to the function blocks;
another interface to be connected to the host interface and to present the capabilities in a manner corresponding to an operating system technique to interface one of the operating systems with the capabilities; and
at least two of the function blocks being protocol modules associated with respective protocols, the protocol modules being to perform processing related to protocol offload and remote direct memory access (RDMA) protocol, the adapter also to provide a switching function to provide arbitration in the adapter to selectively control data transfer between the ports, the protocol modules, and memory.

2. The apparatus of claim 1, wherein:
the another interface is comprised in the adapter; and
the adapter includes an arbiter to selectively couple the protocol modules to the ports and to a memory interface, the memory interface being coupled to the memory.

3. The apparatus of claim 1, further comprising:
a mapping system to map the capabilities presented to the one of the operating systems as virtual devices and also to map the virtual devices to the function blocks.

4. The apparatus of claim 1, wherein:
the host computer includes a plurality of processing units; and
the apparatus further comprises another input/output adapter to be coupled to the network.

5. The apparatus of claim 1, wherein:
the adapter comprises packet parsers coupled to the ports.

6. The apparatus of claim 1, wherein:
the adapter comprises the memory; and
the apparatus comprises a plurality of host central processing units, and host memory coupled to the central processing units and to the host interface.

7. The apparatus of claim 1, wherein:
the techniques to interface with the capabilities are different from each other; and
the function blocks do not correspond to the operating system technique.

8. The apparatus of claim 1, wherein:
the processing is related to TCP offload, iWARP protocol, and iSCSI protocol.

9. A method comprising:

coupling an input/output adapter to a network and to a host interface of a host computer, the adapter including capabilities, the host computer comprising a host central processing unit and being capable of using a plurality of operating systems that have techniques to interface with the capabilities, the adapter including function blocks to provide the capabilities, the adapter also including network ports to be connected to the network and being coupled to the function blocks; and coupling another interface to the host interface and so as to present the capabilities in a manner corresponding to an operating system technique to interface one of the operating systems with the capabilities;

at least two of the function blocks being protocol modules associated with respective protocols, the protocol modules being to perform processing related to protocol offload and remote direct memory access (RDMA) protocol, the adapter also to provide a switching function to provide arbitration in the adapter to selectively control data transfer between the ports, the protocol modules, and memory.

10. The method of claim 9, wherein:
the another interface is comprised in the adapter; and
the adapter includes an arbiter to selectively couple the protocol modules to the ports and to a memory interface, the memory interface being coupled to the memory.

11. The method of claim 9, further comprising:
a mapping system to map the capabilities presented to the one of the operating systems as virtual devices and also to map the virtual devices to the function blocks.

12. The method of claim 9, wherein:
the host computer includes a plurality of processing units; and
the apparatus further comprises another input/output adapter to be coupled to the network.

13. The method of claim 9, wherein:
the adapter comprises packet parsers coupled to the ports.

14. The method of claim 9, wherein:
the adapter comprises the memory; and
the apparatus comprises a plurality of host central processing units, and host memory coupled to the central processing units and to the host interface.

15. The method of claim 9, wherein:
the techniques to interface with the capabilities are different from each other; and
the function blocks do not correspond to the operating system technique.

16. The method of claim 9, wherein:
the processing is related to TCP offload, iWARP protocol, and iSCSI protocol.

* * * * *